(12) United States Patent
Caratelli

(10) Patent No.: US 10,128,562 B2
(45) Date of Patent: Nov. 13, 2018

(54) LTE/WI-FI WIRELESS ROUTER

(71) Applicant: THE ANTENNA COMPANY INTERNATIONAL N.V., Willemstad (CW)

(72) Inventor: Diego Caratelli, Duizel (NL)

(73) Assignee: The Antenna Company International N.V., Willemstad (CW)

( * ) Notice: Subject to any disclaimer, the term of this patent is extended or adjusted under 35 U.S.C. 154(b) by 310 days.

(21) Appl. No.: 15/109,259

(22) PCT Filed: Dec. 31, 2013

(86) PCT No.: PCT/NL2013/050964
§ 371 (c)(1),
(2) Date: Jun. 30, 2016

(87) PCT Pub. No.: WO2015/102485
PCT Pub. Date: Jul. 9, 2015

(65) Prior Publication Data
US 2016/0329632 A1    Nov. 10, 2016

(51) Int. Cl.
| H01Q 1/48 | (2006.01) |
| H01Q 1/24 | (2006.01) |
| H04W 88/10 | (2009.01) |
| H04W 84/12 | (2009.01) |

(52) U.S. Cl.
CPC ............ *H01Q 1/246* (2013.01); *H01Q 1/48* (2013.01); *H04W 84/12* (2013.01); *H04W 88/10* (2013.01)

(58) Field of Classification Search
CPC ......... H01Q 1/246; H01Q 1/48; H04W 84/12; H04W 88/10
USPC .......................................................... 343/702
See application file for complete search history.

(56) References Cited

U.S. PATENT DOCUMENTS

| 8,217,843 B2 * | 7/2012 | Shrtrom | H01Q 1/2291 343/702 |
| 2009/0121966 A1 * | 5/2009 | Song | H01Q 1/2291 343/893 |
| 2013/0241797 A1 * | 9/2013 | Kuo | H01Q 1/243 343/876 |

FOREIGN PATENT DOCUMENTS

| CN | 201839451 | 5/2011 |
| EP | 2083472 A1 | 7/2009 |
| EP | 2523527 A1 | 11/2012 |
| WO | WO2013064872 A1 | 5/2013 |
| WO | WO2013113143 A1 | 8/2013 |

OTHER PUBLICATIONS

Mediatek—"Analysis Usage Scenario for In-Device Coexistence Avoidance" Aug. 23-27, 2010, Madrid, Spain.

* cited by examiner

*Primary Examiner* — Andrea Lindgren Baltzell
(74) *Attorney, Agent, or Firm* — Myron Greenspan Lackenbach Siegel LLP

(57) ABSTRACT

The invention relates to a wireless router, comprising at least one first antenna suitable to operate within a Wi-Fi frequency band, said first antenna comprising a ground plane and a first probing structure. The invention also relates to a second antenna comprising a second probing structure, wherein said second antenna is configured to be mounted as add-on to said Wi-Fi router. The invention further relates to an assembly of multiple second antennas.

33 Claims, 9 Drawing Sheets

LTE/WI-FI WIRELESS ROUTER

Figure 1:
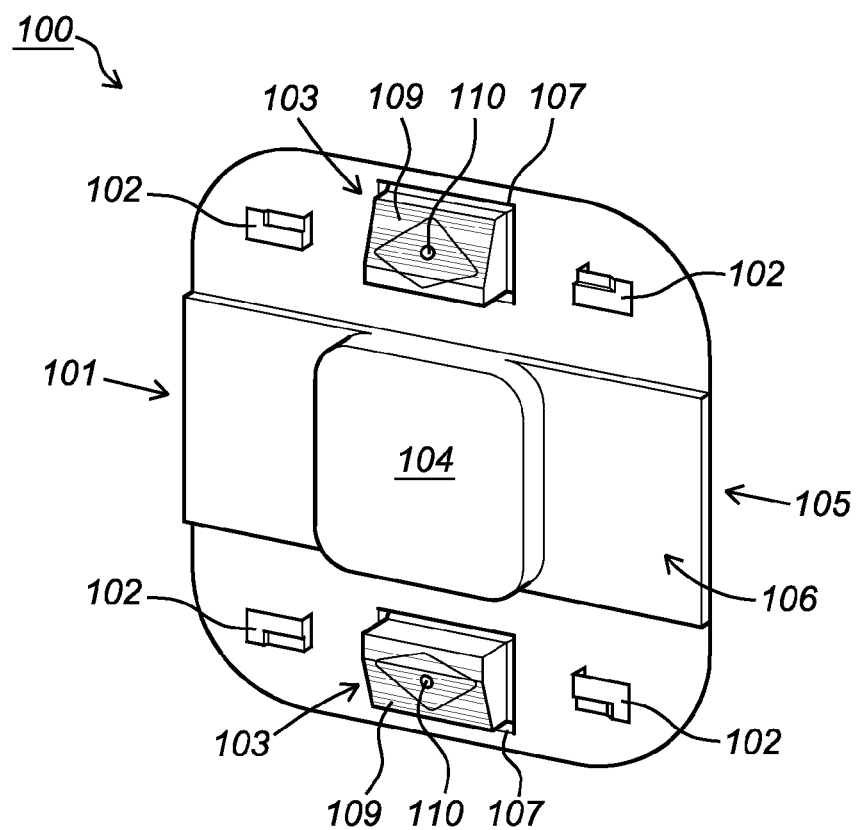

The invention relates to a wireless router, comprising at least one first antenna suitable to operate within a Wi-Fi frequency band, said first antenna comprising a ground plane and a first probing structure. The invention also relates to a second antenna comprising a second probing structure, wherein said second antenna is configured to be mounted as add-on to said Wi-Fi router. The invention further relates to an assembly of multiple second antennas.

The growth of mobility—and the way it has changed our lives—is unprecedented. Close to 80 percent of the world's population now enjoys access to a mobile phone. In about a hundred countries around the world, there are now more mobile devices than people. Exciting new devices, including iPhones, Android-based smartphones, and tablets, are flooding the market and consuming large amounts of mobile network traffic. Compelling video, social networking, and other innovative applications running on these latest devices are clogging mobile networks with massive new sources of data.

In the decade or so that Wi-Fi has existed, most technologists and mobile industry executives viewed it as the "poor cousin" to licensed mobile communications. Because it operated in unlicensed spectrum and suffered from security issues, interference, and poor quality of service, most industry pundits saw it merely as a wireless replacement for the LAN cable. Wi-Fi hotspots did begin to appear in homes, offices, and public spaces, such as hotels and coffee shops. However, mobile operators never viewed this as a viable business, and they did not consider Wi-Fi a threat to their business. In fact, it wasn't until recently that mobile operators even acknowledged the existence of this alternative wireless network and began to allow Wi-Fi-enabled smartphones onto their mobile networks. While mobile operators were building out their 3G mobile networks, much was quietly happening in the world of Wi-Fi. Wi-Fi began to take off with the nearly ubiquitous integration of Wi-Fi into laptops and a simple user interface integrated into computer operating systems. Now, nearly all personal mobile devices, including smartphones, tablets, cameras, and game consoles, are Wi-Fi enabled. Mobile operators have realized that they can use Wi-Fi in congested areas to offload some of the heavy mobile data traffic. In addition to temporarily relieving congestion and improving customer experience, Wi-Fi can improve the overall economics of their network deployment and operations. As large telecom providers that build and operate both mobile and wire line broadband networks, these operators typically have their own Wi-Fi networks. To this end, a considerable number of Wi-Fi routers (access points) is used by the mobile operators to build such a regional, national, and even global Wi-Fi network. Although due to this development the number of Wi-Fi routers and the total Wi-Fi coverage area rapidly increases, there is additionally an increasing need to make more use of LTE technologies which provide substantially faster data transfer speeds and which enable connected devices with widespread network coverage.

It is an object of the invention to provide an improved wireless router, in particular a Wi-Fi router.

It is another object of the invention to enable existing Wi-Fi routers to operate within an LTE frequency band.

It is a further object of the invention to enable existing Wi-Fi routers to operate within an LTE frequency band, wherein coupling between the Wi-Fi frequency band and the LTE frequency band is reduced as much as possible.

At least one of these objects can be achieved by providing a wireless router according to the preamble, comprising: at least one first antenna suitable to operate within a Wi-Fi frequency band, said first antenna comprising a conductive ground plane and a first probing structure, wherein the ground plane of the at least one first antenna is configured for mounting a second probing structure of a at least one second antenna, and wherein the router further comprises: at least one second antenna suitable to operate within an LTE frequency band, which is mounted as add-on to the ground plane of the first antenna, wherein a second probing structure of the second antenna is coupled to the ground plane of the first antenna so as to act as a ground plane for the at least one second antenna for allowing the second antenna suitable to operate within the LTE frequency band. LTE (Long Term Evolution) is a global 4G standard, with researchers and development engineers throughout the world participating in the joint-LTE radio access standardization effort. The LTE standard is tightly integrated with GPRS/UMTS networks and represents an evolution of radio access technologies and networks for UMTS.

By adding at least one second antenna, said second antenna being configured to operate with an LTE frequency band, as an add-on unit to an already prefabricated and possibly already used Wi-Fi router, said Wi-Fi router can be given an additional functionality of LTE router. The addition of this advantageous functionality is realized in an efficient manner, by mounting the second antenna as add-on unit to the ground plane of the first antenna, (Wi-Fi antenna), such that the ground plane of the first antenna will also be used as ground plane for the at least one second antenna (LTE antenna). Hence, the ground plane of the at least one first antenna will become a common ground plane for both the at least one first antenna and the at least one second antenna. Hence, the idea is to provide existing Wi-Fi router afterwards—after being fabricated—an additional LTE functionality in a relatively efficient manner. This solution will be significantly cheaper compared to the option of complete replacement of an existing Wi-Fi router by a new router including both Wi-Fi and LTE technology.

Preferably the at least one first antenna and the at least one second antenna are positioned at a distance from each other. In this manner coupling (electromagnetic interference) between the first antenna and the second antenna can be reduced, in particular in the frequency bands used during operation, as a result of which the overall performance can be substantially improved. This performance can further be improved by positioning the probing structures of the different antennas, in particular of the first antenna and the second antenna, out of the electromagnetic line of sight of each other.

The common (shared) ground plane can either be flat or non-planar, such as curved and/or angulated. Commonly the electrically conductive ground plane is made of metal and/or an electrically conductive polymer. The shape and dimensioning of the ground plane is dependent on the specific circumstances. Commonly, the thickness is limited, as a result of which the ground plane forms a plate or disc.

The second antenna (LTE antenna) is releasably mounted to the ground plane of the first antenna. This releasable connection allows easy detachment of the second antenna, for example in case of replacement of the second antenna by another second antenna of the same or another type. A releasable mounting of the at least one second antenna, as a post-fabrication add-on unit, can be realized by applying a mechanical connection which allows the connection to be inversed leading to disconnection of the second antenna(s).

Embodiments of such a mechanical connection include a snap-fitting connection, a bayonet connection, a screwed connection, and/or an alternative securing connection. Commonly a support structure (mounting bracket) carrying the at least one second antenna will be connected, preferably releasably, to the ground plane of the first antenna(s). This connection can create an electrical connection between the ground plane of the first antenna(s) and the support structure carrying the second antenna(s), which may be favourable for the performance of the second antenna(s).

In a preferred embodiment, the ground plane comprises at least one receiving space for at least partially, and preferably substantially completely, surrounding the second probing structure. Enclosing of the second probing structure by the ground plane will enhance the radiation performance of the second antenna.

Preferably, the second probing structure makes part of a module, said module, thus including the second probing structure, being positioned at a distance from the ground plane. In this manner an insulating space can be created between the ground plane and the module, which is in favour of the performance of the second antenna. This insulating space can be filled with (atmospheric) air. It is also imaginable that at least one insulation element, such as an O-ring, is provided in this insulating space. Examples of a suitable materials for such an insulating material include foam, glass, ceramic, paper, or rubber.

The module commonly comprises a dielectric housing enclosing the second probing structure. The housing is commonly made from a polymeric material and is at least partially suitable to act as an electromagnetic lens, in particular a dielectric resonator. This housing, moreover, protects the second probing structure, and gives the second antenna a desired robustness. Preferably, a top surface of the resonator of the second antenna and the ground plane mutually enclose an angle. This top surface may be either substantially flat or curved. In case of a substantially flat inclination, the inclination is preferably downward in the direction of a closest (outer) peripheral edge of the ground plane, which directs radiation away from the centre of the ground plane, which reduces coupling between the second antenna and one or more other antennas of the router. In case of a curved top surface, the angle of inclination of the top surface will vary with respect to the ground plane in at least one direction. Also in this case, the inclination is preferably downward in the direction of a closest (outer) peripheral edge of the ground plane, which directs radiation away from the centre of the ground plane. In this embodiment, it is moreover preferred to increase the angle of inclination in the direction of aforementioned peripheral edge of the ground plane. Irrespective of the orientation of the top surface of the housing of the module, it is preferred that a part of the resonator is positioned below an upper surface of the ground plane, which will also contribute to an improved radiation pattern, and hence performance of the second antenna.

Preferably, the router comprises a central management unit connected to both the at least one antenna and the at least one second antenna. Hence, the second antenna preferably uses the central management unit to be operated, as a result of which no separate management unit needs to be installed to operate the at least one second antenna. It is commonly desired to reprogram the software (firmware) installed in the central management unit in order to be able to control the operation of the at least one second antenna.

It is conceivable that the router comprises multiple second antennas mounted as add-on the router. This multiple second antenna could be suitable to operate within the same LTE frequency band or mutual distinctive LTE frequency bands. In this latter case, one second antenna could be suitable to operate within the frequency band of 2.1 GHz, while another second antenna, mounted to the same ground plane, could be suitable to operate within the frequency band of 2.6 GHz. The second antennas can be mutually connected by means of a support structure carrying the second antennas. This support structure is commonly a plate or strip, preferably made of metal, which can be attached to the ground plane of the at least one first antenna. In this manner an assembly of multiple second antennas is created which could be marketed as a separate unit for mounting onto an existing Wi-Fi router.

The invention also relates to a second antenna (LTE antenna) for use in a router according to the invention, comprising a second probing structure mountable as add-on to the ground plane of the first antenna. Advantages of such a second antenna and various embodiments have already been described above. As already indicated, the second probing structure preferably makes part of a module, said module being configured to be positioned at least partially within a receiving space of the ground plane, and said module being mountable as add-on to the ground plane. Said module comprises preferably at least one housing, preferably at least one resonator, substantially surrounding the second probing structure. More preferably, the resonator comprises at least one inner casing and at least one outer casing surrounding said inner casing, wherein the inner casing and the outer casing are made of different materials, commonly different polymer materials. These different materials usually exhibit different (desired) material characteristics. In a preferred embodiment, the permittivity of the inner casing is greater than the permittivity of the outer casing. More preferably, the permittivity of the inner casing is be between 6 and 8, while the permittivity of the outer casing is be between 2 and 4. Applying surrounding casings with these permittivity characteristics leads to a favourable performance in case the second antenna is suitable to operate in the frequency ranges of 2.1; 2.5; and 2.6 GHz. In case operation in another frequency range, for example 3.5 GHz, would be desired, then it is commonly more favourable to inverse the materials of the inner casing and the outer casing, such that the permittivity of the inner casing is smaller than the permittivity of the outer casing. The outer casing could be made of and/or covered by a flame retardant material. To this end, it is conceivable to apply a separate flame retardant covering enclosing the outer casing. In case of fire, this flame retardant material inhibits or resists the spread of fire. It has been found that it is preferably that a cross-section of the inner casing has the shape which is substantially similar to a rhombus or kite. In Euclidean geometry, a rhombus ( ◊ ), is a simple (non-self-intersecting) quadrilateral whose four sides all have the same length. Another name is equilateral quadrilateral. The rhombus is often called a diamond. In general, any quadrilateral with perpendicular diagonals, one of which is a line of symmetry, is a kite. Every rhombus is a kite, and any quadrilateral that is both a kite and parallelogram is a rhombus. This kind of shape has been proven to give excellent performance results of both the second antenna and both the router onto which this second antenna is mounted.

In a preferred embodiment, the second antenna comprises a band pass filter ensuring a relatively good insertion loss in the Wi-Fi related frequency band and a relatively small insertion loss in the LTE related frequency band. This band pass filter may be directly integrated with the geometry of the second probing structure. To this end, the band pass filter could be formed by a printed band pass filter. This type of band pass filter leads to a relatively compact construction, which is therefore relatively efficient. Embodiments of this type of band pass filter include a microstrip band pass filter, a strip line band pass filter, and a coplanar waveguide band pass filter.

The second antenna is preferably suitable to operate within an LTE frequency band of 2.1 GHz and/or 2.6 GHz, which are the most commonly used frequency bands to connect wireless devices, such as smartphone, PDAs, laptops, to the Internet or another network.

The invention further relates to an assembly of multiple second antenna according to the invention and at least one support structure for mounting said second antennas at a mutual distance for use in a router according to the invention, wherein the support structure is configured to be attached to the ground plane of the first antenna of the router. The support structure functions as bracket or bridge carrying the second antennas. This support structure may be formed by a plate, in particular an electrically conductive plate, or strip, in particular an electrically conductive strip. The support structure may be provided with one or more securing elements, such as screws or screw holes, for attaching the support structure directly or indirectly to the ground plane of the first antenna(s). Eventually, the support structure is provided with one or multiple holes for guide-through of electronic equipment, such as electrical conduits and electrical connectors.

Figure 2:
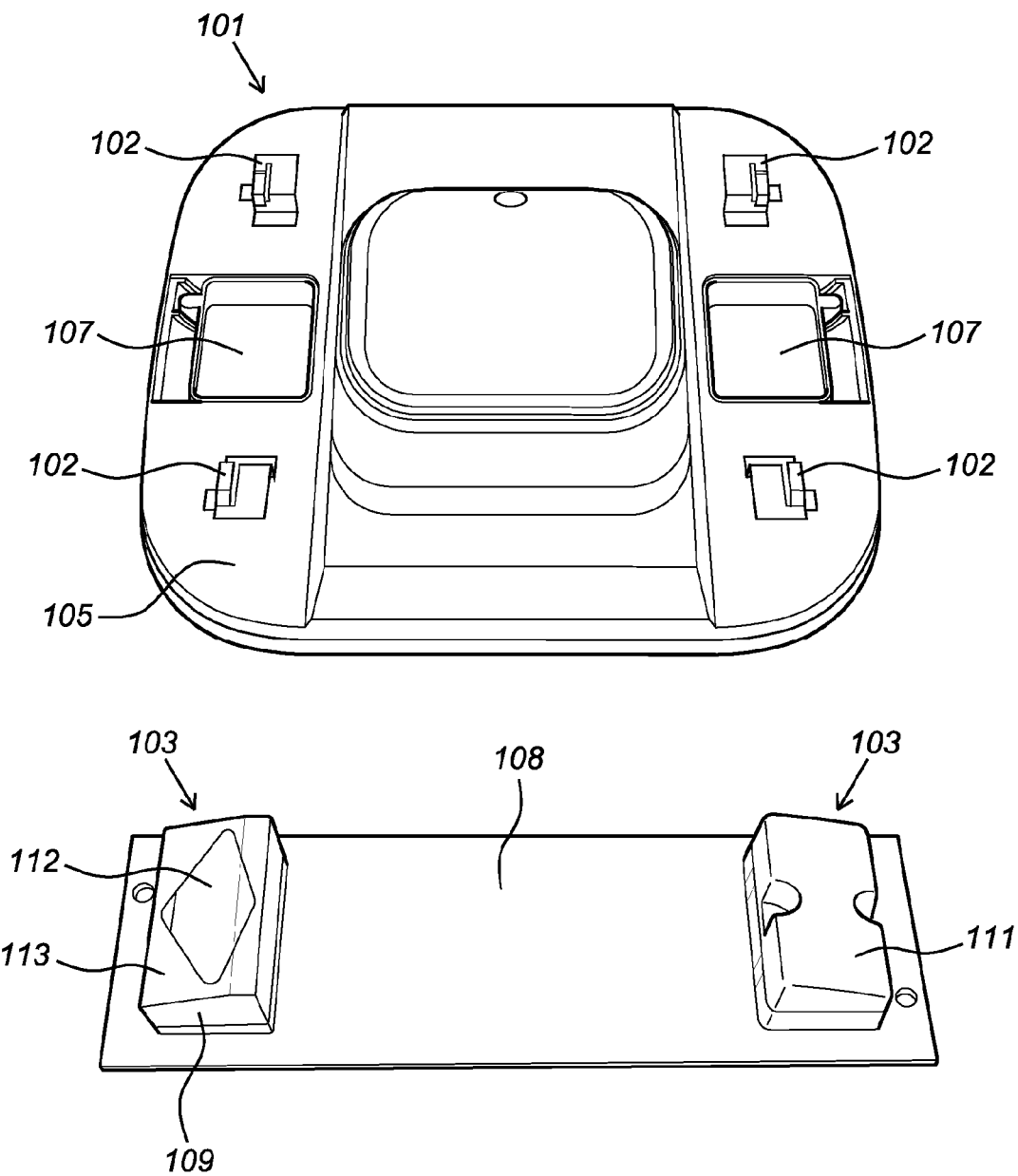
Figure 3:
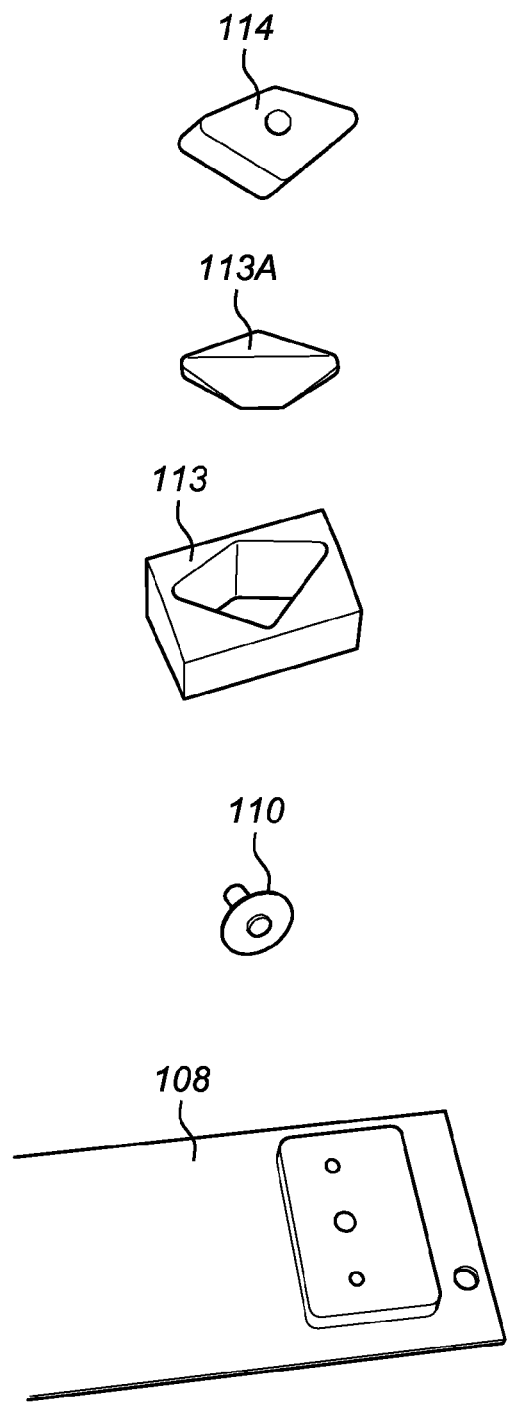
Figure 4A:
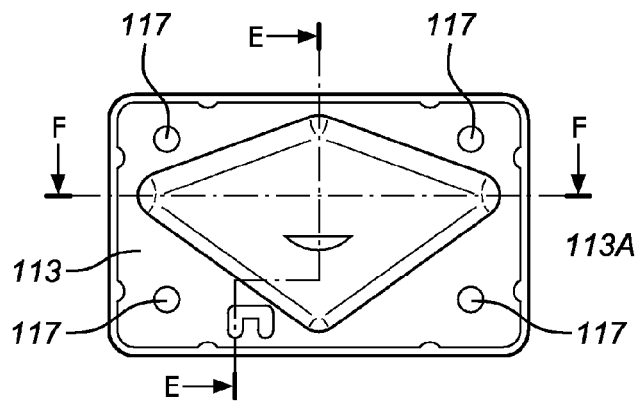
Figure 4C:
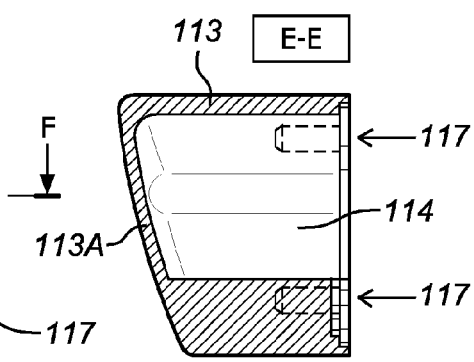
Figure 4B:
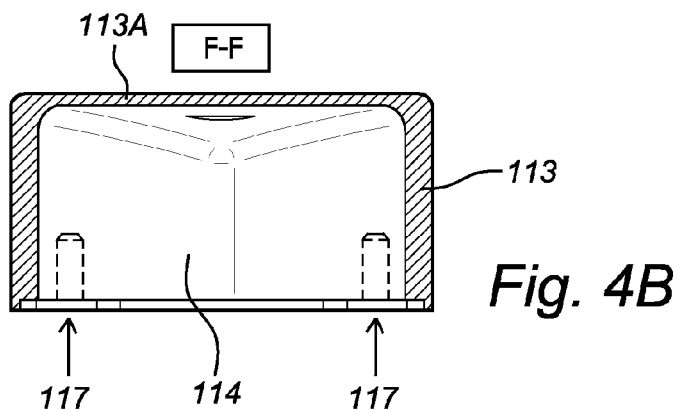
Figure 4D:
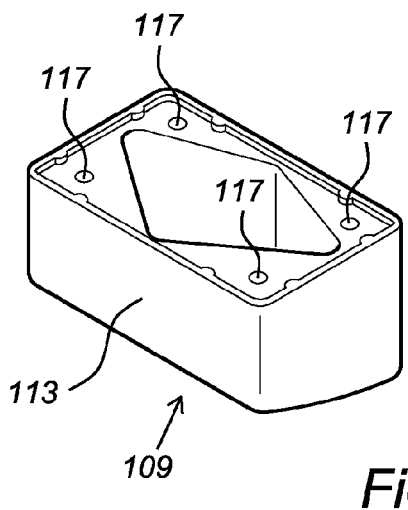
Figure 4D:
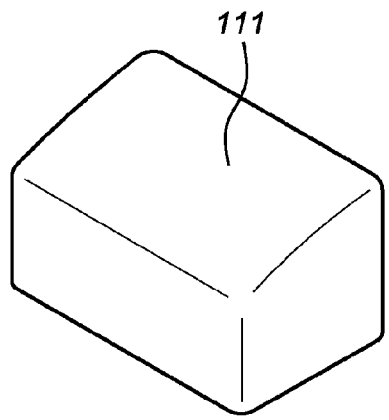
Figure 5:
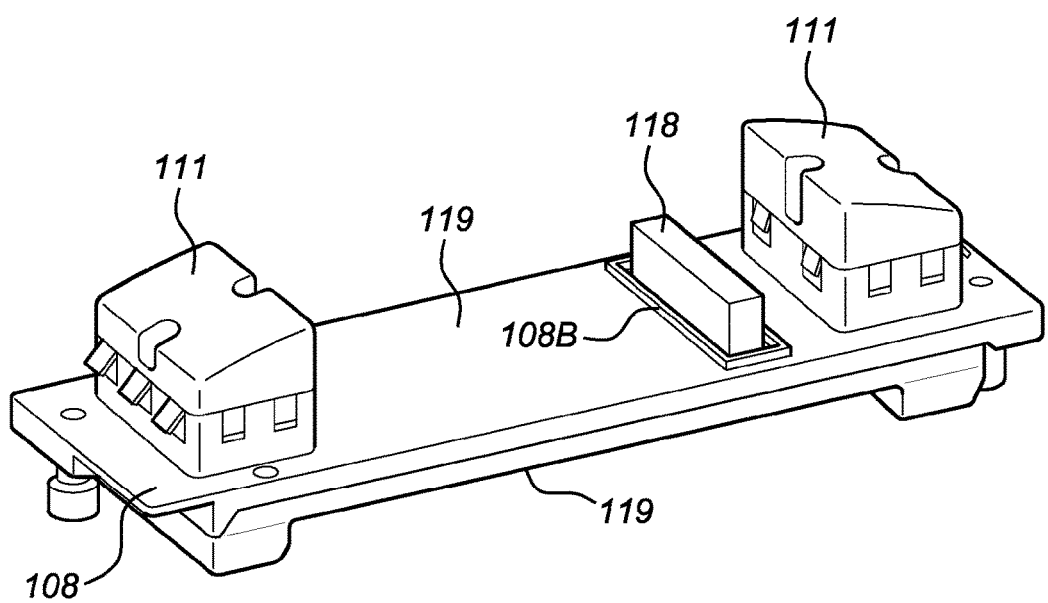
Figure 6A:
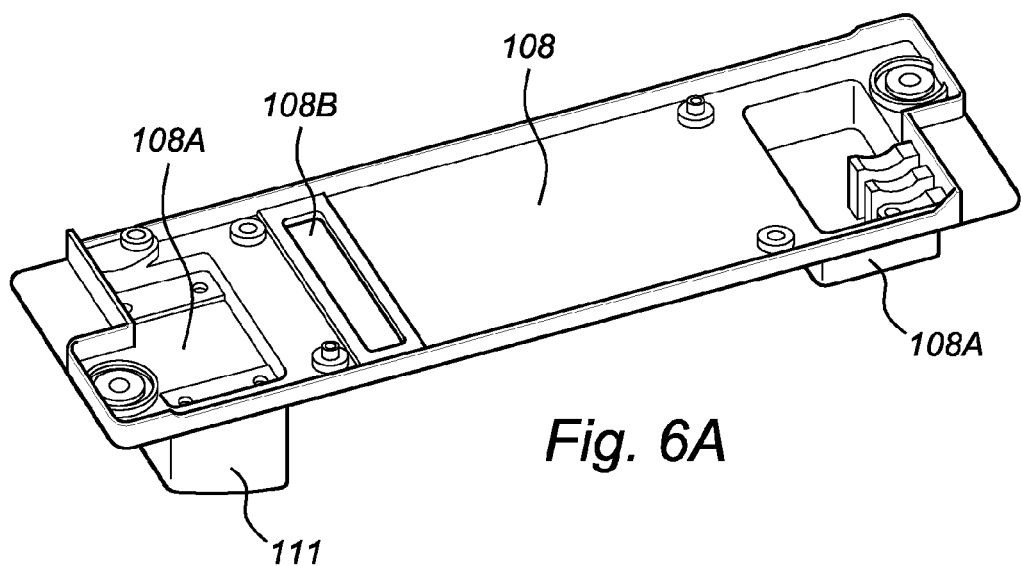
Figure 6B:
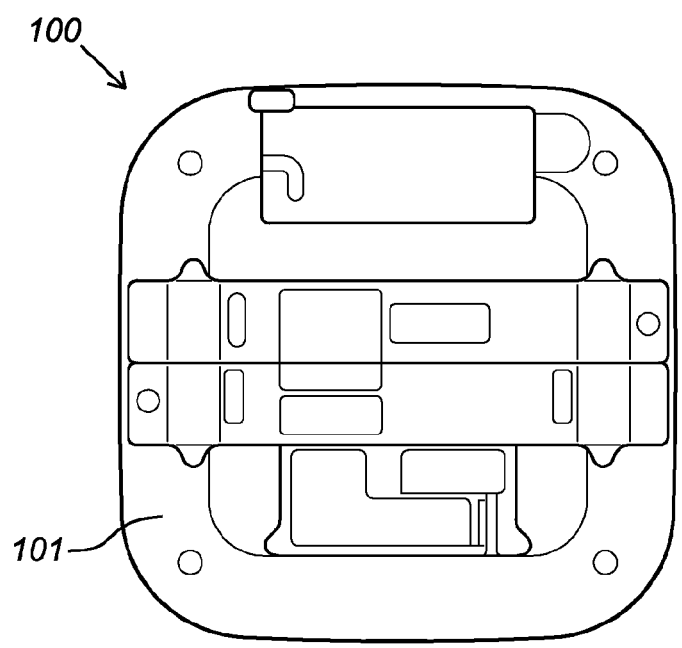
Figure 7:
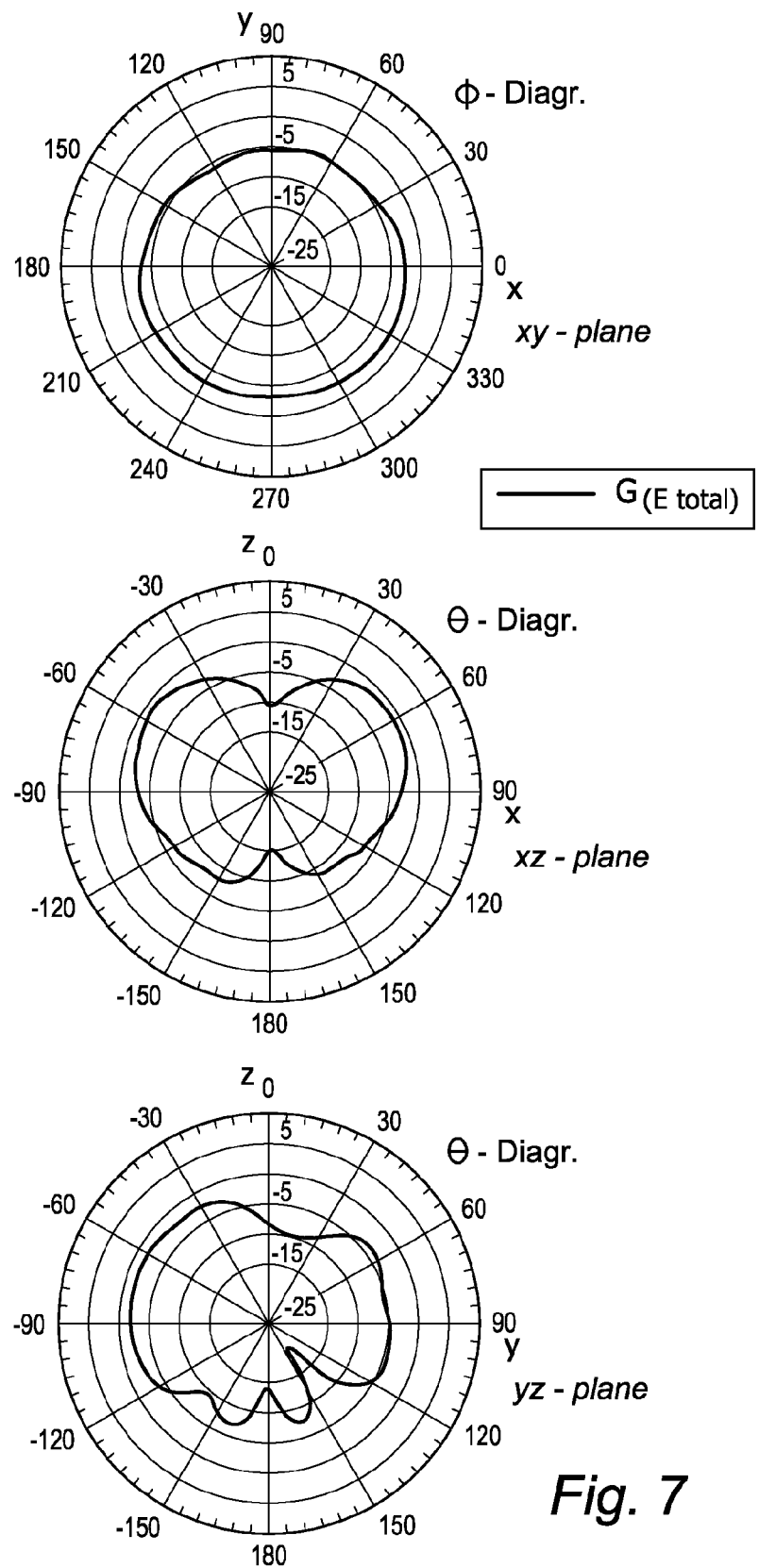
Figure 8:
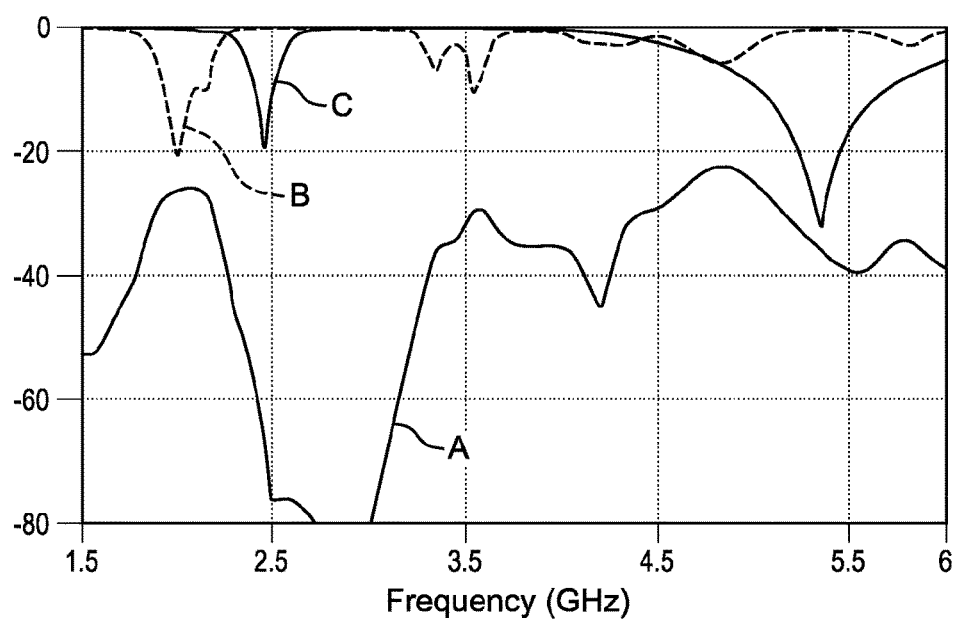
Figure 9:
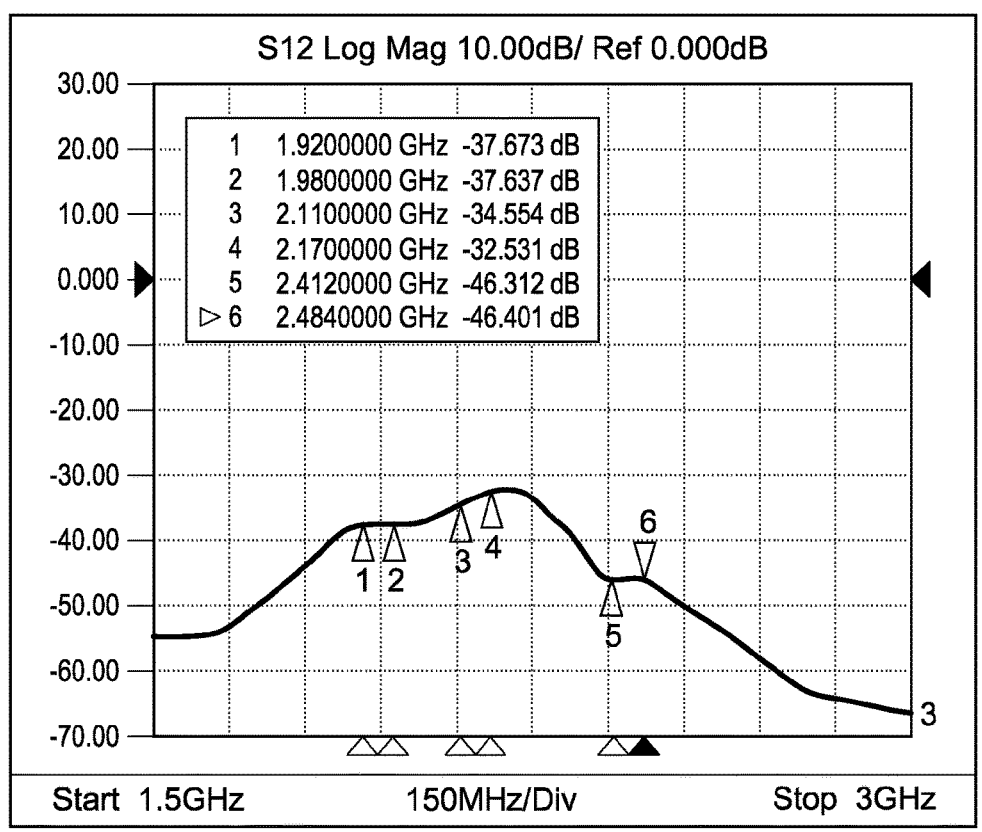

The invention will be elucidated on the basis of non-limitative exemplary embodiments shown in the following figures. Herein:

FIG. 1 shows a perspective view of a wireless router according to the invention, FIG. 2 shows a perspective top view of the wireless router according to FIG. 1 in a disassembled state, FIG. 3 shows a perspective view of a second antenna in a disassembled stated as used in the router as shown in FIGS. 1 and 2, FIGS. 4*a*-4*d* show different views of the second antenna as shown in FIG. 3, FIG. 5 shows an assembly of multiple second antennas according to FIGS. 3-4*a* for use in a router as shown in FIGS. 1 and 2, FIG. 6*a* shows a perspective rear view of the assembly of LTE antennas according to the previous figures, FIG. 6*b* shows a rear view of the router according to FIG. 1, FIG. 7 shows an overview of the radiation pattern of the second antenna as shown in the previous drawings, at 2,145 GHz and in different directions, FIG. 8 shows a chart wherein in particular the coupling between a first antenna and a second antenna of the router, as shown in the previous figures, is visualized, and FIG. 9 shows the measured isolation characteristics between a Wi-Fi antenna and an LTE filtenna for a distinctive mutual positioning of the antennas, as used in a router according to the invention FIG. 1 shows a perspective view of a wireless router 100 according to the invention. In fact the router 100 as shown is an assembly of a prefabricated, thus existing, Wi-Fi router 101 comprising four Wi-Fi antennas 102 (first antennas), onto which router 100 two LTE antennas 103 (second antennas) have been mounted afterwards. The wireless router 100 serves as an access point for a wireless segment of a LAN, WAN, and the like to pass data. The wireless router 100 enables by means of the Wi-Fi antennas 102 a WLAN with 802.x based WLAN infrastructure in compliance with IEEE standards. The Wi-Fi antennas 102 may operate in various bands including 2.4 GHz, 5 GHz and incorporate spread spectrum techniques. The transmission rate may range from 11 Mbps (for 802.11b) to 54 Mbps (for 802.11g) to 450 Mbps (for 802.11n) to 3 Gbps (802.11ac) and may operate in full or half duplex modes. The wireless router 100 enables by means of the LTE antennas 103 communication in at least one LTE frequency band. At least one of the LTE antennas 103 is suitable to operate within an LTE frequency band of 2.1 GHz. The other antenna 103 could be configured to operate in the same LTE frequency band of 2.1 GHz, although it is also conceivable to configure the second LTE antenna 103 to operate within another LTE frequency band, such as 2.6 GHz. Although not shown, the wireless router 100 includes a processor that is in electrical communication with a bus and a memory, which is collectively referred to with reference sign 104. The processor may include a microprocessor, controller, or the like for executing software code. The memory may include a variety of memory components such as a RAM, ROM, flash memory, non-volatile memory, and the like. An operating system resides on the memory to enable data manipulation and routing of data packets in managing network traffic. The operating system may support broadband gateway functions including IP/Ethernet or PPPoE connection, IP routing, WAN port MAC adjustment, DNS proxy, Dynamic DNS, DHCP server, DHCP/BOOTP client, NAT/NAPT, virtual server, and DMZ hosting. The memory may further include a security application to provide network security mechanisms such as layer 2/3/4 access control, firewall, packet filtering, DoS prevention, and intrusion detection. The router may include WLAN security options such as WEP with 64/128-bit of key, WEP plus 802.1x/RADIUS authentication, WPA with 802.1x/RADIUS authentication & key management, and WPA with preshared key mode. The antennas 102, 103 may support full duplex capability. The wireless router 100 commonly further includes a heat sink (not shown) to lower device temperature by dissipating heat into the surrounding air. The heat sink may be disposed in proximity to and physically couple to an signal strength amplifier of the router to receive the brunt of the heat. The wireless router 100 may further include a wire interface to provide wired network connections. The wire interface may include one or more ports to provide hardwire connection such as CAT-5, twisted pair, coaxial and the like to a LAN. The router 100 may include an Ethernet switch to manage network traffic through the ports. The Ethernet switch may be implemented with 10/100 Mbps auto negotiation, half/full duplex auto negotiation, and MDI/MDI-X cross-over auto detection. The wire interface may include an internet access port to enable electrical communication with a broadband connection such as a cable/DSL modem. The broadband connection converts between Ethernet and broadband to enable internet communication.

Referring in more detail to FIG. 1, each of the Wi-Fi antennas 102 comprises a Wi-Fi probing structure 102*a*, in particular a PIFA-structure (planar inverted F-antenna), and a ground plane 105 surrounding said probing structure 102*a*. The ground plane 105 is as shared ground plane 105, also referred to as a common ground plane or a collective ground plane, formed by a single metal plate. Each probing structure 102*a* of each Wi-Fi antenna 102 is configured to co-act with said (single) ground plane 105. The ground plane 105, the Wi-Fi probing structures 102*a* and the electronics 104 of the router 100 are covered by means of a protective covering 106, which is usually made of an insulating material, such as plastic. Both the ground plane 105 and the cover 106 are provided with two receiving spaces 107 for receiving both LTE antennas 103 respectively. A lower side of the LTE antennas 103 are mutually connected by means of a metal strip 108 (or plate) as shown in FIG. 2. Each LTE antenna 103 comprises an insulating housing 109 in which an LTE probing structure 110 is accommodated. This assembly is also referred to as a module of the LTE antenna 103. The insulating housing 109 is more or less blocked shaped (cuboidal shape), which will be discussed below in more detail. The housing 109 is positioned at a distance from the ground plane 105. Between the housing 109 and the ground plane 105 an (insulating) air gap may be present and/or another insulating material, such as foam or rubber. Commonly each insulating housing 109 is covered by a protective covering 111 which is shown in FIG. 2. This covering 111 is preferably made of a flame retardant material. FIG. 2 shows a perspective top view of the wireless router 100 according to FIG. 1 in a partially disassembled state, wherein the assembly of mutually connected LTE antennas 103 has been disconnected from the existing Wi-Fi router 101. In FIG. 2 a part of the protective covering 106 of the Wi-Fi router 101 is not shown, which makes the Wi-Fi probing structures 102 more visible as well as the metallic ground plane 105. In FIG. 2 also the rectangular receiving spaces 107 in the ground plane 104 are clearly shown. The metallic strip 108 connecting both LTE antennas 103 will be mounted to a rear side of the ground plane 105 (see FIG. 6b), and will be attached in this embodiment by means of two metallic screws (not shown). To this end, the metallic strip 108 is provided with two screw holes 112 for receiving said screws. Consequently, a desired electrical connection is made between the ground plane 105 and the metallic strip 108. The insulation housing 109 of each LTE antenna 103 acts at least partially as an electromagnetic lens, wherein the lens can be a dielectric resonator leading to a dielectric resonator antenna (DRA). Electromagnetic radiation occurs as a result of the excitation of radio waves into the inside of the resonator material by a transmitter circuit. The walls of the resonator are partially transparent to radio waves, allowing the radio power to radiate into space. These resonating lenses lack metal parts, which would affect the energy dissipation within the lens, and therefore have lower losses and are more efficient than conventional metal antennas. After assembling (see FIG. 1), it is preferred that at least a part of said housing 109, in particular said lens, is positioned below an upper surface 105a of the ground plane 105, which enables an improved radiation pattern of the LTE antenna 103. As shown in FIG. 1, after assembling a (substantial) part of said housing 109, in particular said lens, is extending with respect to the upper surface 105a of the ground plane 105, which also enables an improved radiation pattern of the LTE antenna 103. Further improvements of the radiation pattern of the LTE antennas 103 can be achieved, amongst others, by giving the insulating (dielectric) housing 109 a purposive design and structure.

As shown in FIGS. 1 and 2, and in more detail in FIGS. 3, and 4a-4d, a top surface of the insulating housing 109 has an inclined geometry, and in particular a curved geometry. The top surface of the insulating housing 109 inclines downward in the direction of a closest edge of the ground plane 105. Preferably, the angle of the inclination, with respect to a top surface of the ground plane 105, increases in the direction a closest edge of the ground plane 105. As shown in FIG. 1, the top surfaces of both LTE antennas 103 are thus directed away from each other, which reduces coupling (electromagnetic interference) between an LTE antenna 103 with respect to (a probing structure of) another antenna 102, 103 and therefor improves the performance of the antennas 102, 103 of the router 100. It is further shown in FIGS. 1-4d that the insulating housing 109 comprises an outer casing 113 and an inner casing 114 enclosed by said outer casing 113 (and partially by the metallic strip 108). The outer casing 113 has a rectangular outline (as seen in cross-section) and may be provided with a separate lid 113a. The lid has a thickness of approximately 1 mm in this exemplary embodiment. The lid 113a may also be integrated with the outer casing 113 to form a single piece. The outer casing 113 is provided with a receiving space 115 which has a shape which is substantially similar to a rhombus (parallelogram) or kite (single-side stretched parallelogram) for well-fitting to a congruent outline of the inner casing 114. Kite shapes have exactly two pairs of consecutive sides that are congruent, which does not allow for both pairs of opposite sides to be parallel. This shape is also referred to as a diamond shape. The inner casing 114 is provided with a central hole 116 for receiving at least a pin shaped part of the metal LTE probing structure 110. As shown in FIG. 3, the connecting strip 108 is provided with a (metal) elevation 108 for mounting the aforementioned components 110, 113, 113a, 114. The LTE probing structure 110 is positioned on top of the elevation 108a, on top of which the inner casing 114, the outer casing 113, and the lid 113a are positioned on top of the probing structure 110. The dielectric outer casing 113 is preferably attached to the elevation 118a, for example by means of screws. To this end, the outer casing 113 is provided with screw holes 117 (see FIGS. 4a-4d). The outer casing 113 (including the lid 113a) and the inner casing are both made dielectric materials, preferably a polymer. The relative permittivity of the inner casing 114 is preferably greater than the relative permittivity of the outer casing. More preferably, the relative permittivity of the inner casing 114 is, about 7, while the relative permittivity of the outer casing 113 (including the lid 113a) is, about 3. These values have turned out to be favourable in case the LTE antenna 103 is configured to operate in a LTE frequency band of 2.1 GHz, 2.5 GHz, or 2.6 GHz. In case other LTE frequency bands would be used, such as, for example, 3.5 GHz, an inversed relative permittivity would often be more favourable. The LTE probing structure 110 is preferably integrated with a suitable filtering section, such as a strip line band pass filter, ensuring a relatively large insertion loss in the Wi-Fi relates frequency band and a relatively small insertion loss in the LTE related frequency band. Due to the application of such a band pass filter, the LTE antenna 103 is also referred to as a filtenna. It is further shown in FIG. 6a that the metallic strip 108 is provided with a rectangular hole 108b for allowing an electrical connection 118 to be led through the strip 108 to connect said electrical connection 118 to the electronics 104 of the router 100 (also see FIG. 5). The strip 108 may be provided with a protective coating 119.

FIG. 7 shows an overview of the transmitting radiation pattern ($G_E$) of the LTE antenna 103 as shown in the previous drawings, at 2,145 GHz and in different directions (xy-plane, xz-plane, and yz-plane), which gives an indication of the spatial (omnidirectional) radiation pattern of the LTE antenna 103. As can be seen in the plotted charts, the ripple level featured by the radiation pattern in the azimuthal plane (xy-plane) is about 2 dB. Experimental testing of the router 100 as shown in the previous drawings, has led to the following further results: the level of the realized gain ($G_r$) varies from about −4 to −1 dB, the total efficiency ($e_{tot}$) being about 40%. In different filtenna configurations, the efficiency ranges from about 80% to 95%, the peak level of the realized gain being about 3.4 dB. FIG. 8 shows a chart wherein in particular the coupling between a first antenna and a second antenna of the router, as shown in the previous figures, is visualized. The lower line A represents the coupling coefficient between the return loss of the LTE antenna (filtenna) 103 and the Wi-Fi antenna 102. The return loss of the filtenna 103 at different frequencies is shown at the top of the chart and relates to the line B having the first downward peak (at approximately 2.0 GHz). The return loss of the Wi-Fi antenna 102 (PIFA) is also shown at the top of the chart and relates to the line C having the second downward peak (at approximately 2.4 GHz). As it can be seen in the chart the parasitic coupling level in the Wi-Fi frequency band of 2.4 GHz is very low and substantially smaller than about −50 dB. This means that the electromagnetic interference in the Wi-Fi operation range can be kept to a minimum, while the dual and total performance of the router 100 can reach relatively high levels, which makes the router 100 according to the invention greatly suitable to operate both in the Wi-Fi frequency band and—simultaneously—also in a near LTE frequency band. Similarly, the parasitic coupling level in the LTE band can be kept below a suitable threshold in order to avoid the blocking of the Wi-Fi radio channel because of the interference level induced by LTE antenna system (see FIG. 9).

FIG. 9 shows the measured isolation characteristics between the Wi-Fi antenna and LTE filtenna for a distinctive mutual positioning of the antennas, as used in a router according to the invention. More in particular, the vertical axis of the graph represents the coupling level (S12) in logarithmic scale (dB) between the radiating structures, while the horizontal axis represents the working frequency in GHz. As it can be seen in the chart of FIG. 9, the spurious coupling level measured experimentally in the LTE and Wi-Fi frequency bands, respectively, is extremely reduced and, more precisely, smaller than −32 dB and −46 dB. This performance is useful to keep the overall throughput level, and hence the quality of service, over both the LTE and Wi-Fi radio channels essentially unaffected by the physical coexistence between the LTE and Wi-Fi antenna elements sharing the same platform integrated in the router.

It will be apparent that the invention is not limited to the exemplary embodiments shown and described here, but that within the scope of the appended claims numerous variants are possible which will be self-evident to the skilled person in this field.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

The invention claimed is:

1. Wireless router (100), comprising:
    at least one first antenna (102) suitable to operate within a Wi-fi frequency band, and
    at least one second antenna (103) suitable to operate within an LTE frequency band,
    said first antenna (102) comprises a conductive ground plane (105) and a first probing structure (102a), wherein the ground plane (105) of the at least one first antenna (102) is configured for mounting a second probing structure (110) of a at least one second antenna (103), said at least one second antenna (103) is mounted as add-on to the ground plane (105) of the first antenna (102), wherein the second probing structure (110) of the second antenna (103) is coupled to the ground plane (105) of the first antenna (102) so as to act as a ground plane (105) for the at least one second antenna (103) for allowing the second antenna (103) suitable to operate within the LTE frequency band.

2. Wireless router (100) according to claim 1, wherein the second antenna (103) is releasably mounted to the ground plane (105) of the first antenna (102).

3. Wireless router (100) according to claim 1, wherein the ground plane (105) comprises at least one receiving space (107) for at least partially surrounding the second probing structure (110).

4. Wireless router (100) according to claim 3, wherein the receiving space (107) of the ground plane (105) is configured to substantially completely surround the second probing structure (110).

5. Wireless router (100) according to claim 3, wherein the second probing structure (110) makes part of a module, said module being positioned at a distance from the ground plane (105).

6. Wireless router (100) according to claim 5, wherein between a peripheral side of the module of the second antenna (103) and the ground plane (105) at least one insulation element is provided.

7. Wireless router (100) according to claim 5, wherein the module comprises at least one resonator substantially surrounding the second probing structure (110), and wherein a top surface of the resonator of the second antenna (103) and the ground plane (105) mutually enclose an angle.

8. Wireless router (100) according to claim 5, wherein the module comprises at least one resonator substantially surrounding the second probing structure (110), wherein a part of the resonator is positioned below an upper surface of the ground plane (105).

9. Wireless router (100) according to claim 1, wherein the wireless router (100) comprises at least one securing element for securing the second antenna (103) with respect to the ground plane (105).

10. Wireless router (100) according to claim 9, wherein at least a part of the securing element makes part of a support structure for the ground plane (105).

11. Wireless router (100) according to claim 9, wherein the securing element is at least partly electrically conductive to electrically connect the second probing structure (110) to the conductive ground plane (105).

12. Wireless router (100) according to claim 9, wherein the second antenna (103) is attached to the ground plane (105) by at least one screw.

13. Wireless router (100) according to claim 1, wherein the wireless router (100) comprises a central management unit connected to both the at least one first antenna (102) and the at least one second antenna (103).

14. Wireless router (100) according to claim 1, wherein the mutual orientation of the at least first probing structure (102*a*) and the at least one second probing structure (110) is such that said probing structures (102*a*, 110) are positioned at least partially out of the electromagnetic line of sight of each other.

15. Wireless router (100) according to claim 1, wherein the wireless router (100) comprises multiple second antenna (103) mounted as add-on the router.

16. Second antenna (103) for use in a wireless router (100) according to claim 1, comprising a second probing structure (110) mountable as add-on to a ground plane (105) of a first antenna (102), wherein the second probing structure (110) of the second antenna (103) is configured to be coupled to the ground plane (105) of the first antenna (102) so as to act as a ground plane (102) for the second antenna (103).

17. Second antenna (103) according to claim 16, wherein the second antenna (103) is releasably mountable as add-on to the ground plane (105) of the first antenna (102).

18. Second antenna (103) according to claim 16, wherein the second antenna (103) is provided with at least one snapping element configured to realize a snap-fitting connection between the second antenna (103) and the ground plane (105).

19. Second antenna (103) according to claim 16, wherein the second antenna (103) is configured to be mounted to the ground plane (105) of the first antenna (102) by means of at least one screw.

20. Second antenna (103) according to claim 16, wherein the second probing structure (110) makes part of a module, said module being configured to be positioned at least partially within a receiving space (107) of the ground plane (105), and said module being mountable as add-on to the ground plane (105).

21. Second antenna (103) according to claim 20, wherein the module comprises at least one resonator substantially surrounding the second probing structure (110).

22. Second antenna (103) according to claim 21, wherein the resonator comprises at least one inner casing and at least one outer casing surrounding said inner casing, wherein the inner casing and the outer easing are made of different materials.

23. Second antenna (103) according to claim 22, wherein the permittivity of the inner casing is greater than the permittivity of the outer easing.

24. Second antenna (103) according to claim 20, wherein an outer side of the module, preferably the outer casing as such, is made of a flame retardant material.

25. Second antenna (103) according to claim 22, wherein a cross-section of the inner casing has the shape which is substantially similar to a rhombus or kite.

26. Second antenna (103) according to claim 20, wherein the module is configured to be positioned at a distance from the ground plane (105).

27. Second antenna (103) according to claim 26, wherein a peripheral side of the module is provided with at least one insulating element to provide an insulation between the module and the ground plane (105).

28. Second antenna (103) according to claim 16, wherein the second antenna (103) comprises a band pass filter ensuring a relatively good insertion loss in the Wi-Fi related frequency band and a relatively small insertion loss in the LIE related frequency band.

29. Second antenna (103) according to claim 28, wherein the band pass filter makes integral part of the geometry of the second probing structure (110).

30. Second antenna (103) according to claim 28, wherein the band pass filter is formed by a strip line band pass filter.

31. Second antenna (103) according to claim 16, wherein the second antenna (103) is suitable to operate within an LIE frequency band of 2.1 GHz and/or 2.6 GHz.

32. Assembly of multiple second antennas (103) according to one claim 16 and at least one support structure for mounting said second antennas (103) at a mutual distance for use in a router according to one of claims 1-15, wherein the support structure is configured to be attached to a ground plane (105) of a first antenna (102) of a wireless router (100), wherein a second probing structure (110) of at least one second antenna (103) is configured to be coupled to the ground plane (105) of the first antenna (102) so as to act as a ground plane (105) for the at least one second antenna (103).

33. Assembly according to claim 32, wherein the support structure is formed by a plate, in particular an electrically conductive plate.

* * * * *